(12) United States Patent
Sommer et al.

(10) Patent No.: US 12,580,112 B2
(45) Date of Patent: Mar. 17, 2026

(54) DEVICE WITH DIAMETERAL MAGNETIC ARRAYS FOR INSTALLATION IN MAGNETIC SUBS FOR THE REMEDIATION AND MITIGATION OF SCALE IN PRODUCTION COLUMNS

(71) Applicants:PETRÓLEO BRASILEIRO S.A.—PETROBRAS, Rio de Janeiro (BR); CENTRO BRASILEIRO DE PESQUISAS FÍSICAS, Rio de Janeiro (BR)

(72) Inventors: Rubem Luis Sommer, Rio de Janeiro (BR); Alexandre Zacarias Ignacio Pereira, Rio de Janeiro (BR); Bruno Gomes Da Silva, Rio de Janeiro (BR); Cilene Labre Alves Da Silva De Medeiro, Rio de Janeiro (BR); Andre Leibsohn Martins, Rio de Janeiro (BR); Alexandre Mello De Paula Silva, Rio de Janeiro (BR); Marcus Vinicius Duarte Ferreira, Rio de Janeiro (BR); Elvis Oswaldo López Meza, Rio de Janeiro (BR); Fernando Salatiel De Oliveira, Santos (BR); Hugo Francisco Lisboa Santos, Rio de Janeiro (BR); Bruno Barbosa Castro, Rio de Janeiro (BR); Helga Elisabeth Pinheiro Schluter, Rio de Janeiro (BR); Paulo Guilherme Oliveira De Oliveira, Rio de Janeiro (BR); João Paulo Sinnecker, Rio de Janeiro (BR)

(73) Assignees: Petróleo Brasileiro S.A.—Petrobras, Rio de Janeiro (BR); Centro Brasileiro De Pesquisas Físicas, Rio de Janeiro (BR)

( * ) Notice: Subject to any disclaimer, the term of this patent is extended or adjusted under 35 U.S.C. 154(b) by 421 days.

(21) Appl. No.: 18/354,079

(22) Filed: Jul. 18, 2023

(65) Prior Publication Data

US 2024/0062937 A1 Feb. 22, 2024

(30) Foreign Application Priority Data

Jul. 20, 2022 (BR) .......................... 1020220143285

(51) Int. Cl.
$H01F$ $7/02$ (2006.01)
$B03C$ $1/033$ (2006.01)
(Continued)

(52) U.S. Cl.
CPC ......... *$H01F$ $7/0294$* (2013.01); *$B03C$ $1/0332$* (2013.01); *$B03C$ $1/288$* (2013.01);
(Continued)

(58) Field of Classification Search
CPC ... H01F 7/0294; H01F 7/0221; B03C 1/0332; B03C 1/288; B03C 2201/18; E21B 37/00;
(Continued)

(56) References Cited

U.S. PATENT DOCUMENTS

| | | | |
|---|---|---|---|
| 10,077,634 B2 | 9/2018 | Perio | |
| 2004/0055942 A1* | 3/2004 | Pedersen | E21B 37/00 |
| | | | 210/222 |

(Continued)

FOREIGN PATENT DOCUMENTS

| | | |
|---|---|---|
| BR | PI9702495-3 | 1/1999 |
| BR | PI0609626-3 | 4/2010 |

(Continued)

*Primary Examiner* — Mohamad A Musleh
(74) *Attorney, Agent, or Firm* — Knobbe, Martens Olson & Bear, LLP

(57) ABSTRACT

The present invention refers to a device with diametral magnetic arrays for installations in magnetic SUBs, aiming (Continued)

the remediation and mitigation of inorganic and organic scales in production columns. The proposed magnetic device meets several specific criteria based on the magnetohydrodynamic model (MHD). After applying the said device with the proposed magnetic field, an efficiency of the scale inhibition was experimentally observed through laboratory tests, obtained from the values of the masses encrusted in the walls of the experimental bench system in the laboratory, with respect to the application without magnetic field. The device described herein can be installed in any pipeline used to transport fluids, including underwater pipelines for oil wells. These fluids can be oils, lubricants, gases, steams, water, petroleum or liquids in general.

13 Claims, 9 Drawing Sheets

(51) Int. Cl.
    *B03C 1/28*           (2006.01)
    *E21B 37/00*         (2006.01)
    *F16L 58/00*         (2006.01)

(52) U.S. Cl.
    CPC .............. *E21B 37/00* (2013.01); *F16L 58/00* (2013.01); *B03C 2201/18* (2013.01)

(58) Field of Classification Search
    CPC . F16L 58/00; F16L 55/24; C02F 1/482; C02F 2303/22
    See application file for complete search history.

(56)             References Cited

U.S. PATENT DOCUMENTS

| | | | |
|---|---|---|---|
| 2007/0018764 A1* | 1/2007 | Martinez Garcia ... | H01F 7/0294 335/209 |
| 2010/0264090 A1* | 10/2010 | Ellis ...................... | B03C 1/0332 210/695 |
| 2017/0165679 A1* | 6/2017 | Yount ................... | B03C 1/0332 |

FOREIGN PATENT DOCUMENTS

| | | |
|---|---|---|
| BR | PI0901552-3 | 1/2011 |
| EP | 0 427 241 B1 | 5/1991 |
| GB | 2350632 | 12/2000 |

* cited by examiner

DEVICE WITH DIAMETERAL MAGNETIC ARRAYS FOR INSTALLATION IN MAGNETIC SUBS FOR THE REMEDIATION AND MITIGATION OF SCALE IN PRODUCTION COLUMNS

FIELD OF THE INVENTION

The present invention is related to the technical field of oil and gas, more specifically related to oil production processes, and flow technologies, still more specifically, it refers to a device for installation in magnetic SUBs aiming the remediation and mitigation of inorganic or organic scales in production columns. The device described herein can be installed in any pipeline used to transport fluids, including underwater pipelines for oil wells. These fluids can be oils, lubricants, gases, steams, water, petroleum or liquids in general.

BACKGROUND OF THE INVENTION

With the purpose of providing a better understanding of the present invention, a brief explanation of the state of the art will be presented, as well as the existing problems, where it will be possible for a person skilled in the art to recognize the already existing limiting aspects, in order to understand, at a later time, the technical characteristics of the proposed solution to solve the technical problem.

It is known that saline scales in offshore wells gradually generate flow restrictions and compromise the production of hydrocarbons over time. An alternative for remediation of saline scales in tubes is the use of column elements containing permanent magnets, called Magnetic SUBs.

Studies show that the application of a magnetic field in the vicinity of a pipe can affect the scale crystals formation through the interaction between the magnetic force and the charges of the crystals and ions present in the fluid.

Therefore, the use of anti-fouling magnetic devices proves to be an excellent and relevant alternative for solving this problem, since these equipments are provided with permanent magnets, with excellent magnetic properties, not requiring power supply for operation.

Current technologies allow optimizations in the configurations of magnetic fields regarding the volume of interaction with fluids, the field intensity and the spatial distribution of the field along the equipment. On the other hand, it is noted that there is a lack of a theoretical and practical model that is effective and efficient for the application of this technology.

In view of the above, and in order to solve the aforementioned technical problem, the present invention provides the development of a device with a diametral magnetic arrangement for installation in magnetic SUBs aiming the remediation and mitigation of inorganic and organic scales in production columns.

It is important to emphasize that the magnetic device provided in the present invention meets several specific criteria based on the magnetohydrodynamic model (MHD), which is the theoretical model that studies the interactions between conducting fluids (and also gases) (ionic and/or saline fluids) and magnetic fields.

STATE OF THE ART

In the state of the art, there are devices designated for the remediation and/or mitigation of scales in production columns. However, the state of the art devices have shortcomings related to the efficiency of scale inhibition, in addition to the fact that there is no theoretical-practical model of permanent magnet arrays that is effective during the application of this technology.

Patent document PI0901552-3 provides a magnetohydrodynamic device for preventive control of scale in oil well production columns and uses neodymium magnets (NdFeB) of unspecified grade. Said device uses twelve magnets of which each pair of magnets produces a magnetic field confinement with tangential field lines to the cylindrical shape of the device. During the use of said device, the fluid flows between the separation of the magnets, precisely where the magnetic confinement exists, thus, the fluid flows from outside the device to the internal region of the device. It is known that, on the one hand a fluid flowing in a region of greater magnetic confinement may have positive effects for the formation of amorphous phases of calcium carbonates, on the other hand, due to the change in direction of the fluid flow, this will produce great turbulences just after applying the magnetic field, which will generate large scale effects on the internal walls of said device.

On the other hand, the present invention differs in that it uses sixteen 16 NdFeB magnets of N48SH grade (which presents great magnetic field efficiency for application in media with high temperatures, above 100° C.), furthermore, the magnetic field lines are directed orthogonally related to the cylindrical device (cutting the cylinder orthogonally along the axial axis). The present invention does not produce restrictions on the fluid flow, quite the contrary, it preserves a continuous flow line keeping the internal diameter of the device equal to the diameter of the tubes of the extraction column, in this way there will be less turbulence effects surrounding the application region of the magnetic field, ensuring greater efficiency of action for the formation of soluble phases of calcium carbonate (vaterite and amorphous).

In turn, document U.S. Pat. No. 10,077,634B2 uses solid magnets in the form of a ring with magnetic moments directed along the fluid flow. A problem related to the application of this technology can be identified, which are the magnetic field lines parallel to the fluid flow (parallel to the velocity components of the fluid). It is demonstrated by the magnetohydrodynamic model (MHD) that for an action effect of any magnetic field in a dynamic medium, the fluid has to flow orthogonally to the magnetic field lines produced by any magnet set, otherwise (where the fluid flows parallel to the magnetic field lines) there will be no effect of the magnetic field action on the surrounding fluid.

On the other hand, in the present invention, there are separator plates that have two functions, the first is to protect the magnets against crushing by compression and expansion (where the external and internal pressure differential in the device is considerable as to cause damage to the magnets), and the second function is to protect the magnetization of each magnet, each magnet has a different magnetic moment (but always orthogonal to the flow of the fluid) which in contact with each other will produce magnetic anisotropy effects that over time will end up decreasing the magnetic intensity at the edges of the magnets and subsequently the deformation of the magnetic dipole.

Document PI0609626-3, on the other hand, is mainly applied for cleaning small ferritic materials left by cuts, chips and displaced rust, which are found, for example, in mine holes. These ferritic materials are sedimented in the well holes due to welding, drilling and milling maneuvers inside the holes. This referred document mentions that it is an improvement of the patent published in the United Kingdom N. 2350632, of which the main function of the invention is to collect and attract the ferritic particles to the tool of invention from the application of a magnet set, just after removing the tool will also remove any ferritic particles adhering to it. Thus, this document teaches an external device that will be introduced along the well pipes to remove ferritic objects adhered to the walls of the pipelines.

On the other hand, the present invention differs by acting on "non-ferritic" particles, to minimize the effects of material scales such as carbonates, calcium sulfates, barium and other non-ferritic particles in formation. The present invention is not invasive and does not act as a sediment capture tool, quite the contrary, the present invention is part of the pipeline line for application in wells and acts to prevent the formation of sediments. Also, document PI0609626-3 mentions the fact that you can use a single magnet or more. The magnets are in a radial direction to the hole, which is quite different from the present invention of the dipole magnetic field throughout the region where the fluid flows. Also, the inventors of the technology reported in PI0609626-3 do not explain which type of magnet they can use.

Document EP0427241B1 is part of the general state of the art and applies cylindrical magnets in the form of rings and coherently spaced between them, the direction of the magnetic moments of the magnets are parallel to the fluid flow. This said document uses a helical rotor at the inlet and/or outlet of the fluid, which will produce increases in turbulence in the fluid, which will result in increasing scales in the internal region of the device. Furthermore, said document uses a central shaft which produces densification of the solution on the internal walls of the device, which will also result in scale increments in these regions. Thus, the helical rotor shaft can be deteriorated in applications with dense fluids at high pressure (such as in pre-salt wells), which would result in unfeasibility for these applications. Another limitation observed in this document is the fact that it does not specify what type of magnet is proposed, this characteristic is important to find out up to what order of magnetic field intensity the device will be able to reach.

The present invention differs in that it uses magnets with magnetic moments directed orthogonally to the fluid flow (but magnetized in different directions from which the magnet set forms magnetic dipoles that will rotate 90° after each magnet set, producing an oscillating magnetic field along the fluid flow), thus meeting the basic principle of orthogonality between the velocity components of the fluid and the magnetic field lines, which will have a greater efficiency of the magnetic energy produced by the magnet set applied. The present invention develops a magnetic device which does not obstruct the passage of the fluid inside the device, avoiding turbulence effects and making the application more efficient.

Finally, document PI9702495-3 addresses improvements introduced in a magnetohydrodynamic anti-fouling device for fluid transport pipelines, the magnets produce very similar magnetic fields, both with magnetic field lines parallel to the fluid flow. Again, the magnetohydrodynamic (MHD) theory in question herein requires the principle of orthogonality between the fluid velocity and the magnetic field lines to obtain a higher scaling mitigation efficiency. Furthermore, it is known in practice (also observed in scale tests in the laboratory) that turbulence effects of saline fluids produce greater scales. Turbulent effects are generated by obstructions in view of the fluid step, as is the case in the aforementioned document, where the magnets are placed in contact with the fluid step.

The inventors of the device of said document PI9702495-3 comment that the anti-fouling effects were observed experimentally, but they do not provide information or data about it. Furthermore, the inventors comment that fluid velocity is not a factor dependent on anti-fouling effects, but the MHD model explicitly explains that it is dependent on the velocity components of fluids flowing in the magnetic field region, which is a contradiction to the well-demonstrated and substantiated MHD theory.

Also, two magnets are used to form a dipole magnetic field and the inventors do not explain the types of magnets used in the invention. Compared to the present invention, it is worth mentioning the fact that sixteen magnets with different magnetic moments are used in the device proposed herein, all orthogonally to the fluid flow to form a uniform dipole magnetic field within the fluid flow region, and without the need of the magnets to restrict the fluid step.

BRIEF DESCRIPTION OF THE INVENTION

The present invention refers to a device with diametral magnetic arrays for installations in magnetic SUBs, aiming the remediation and mitigation of inorganic and organic scales in production columns.

The proposed magnetic device meets several specific criteria based on the magnetohydrodynamic model (MHD). After applying the said device with the proposed magnetic field, an efficiency of the scale inhibition was experimentally observed through laboratory tests, obtained from the values of the masses encrusted in the walls of the experimental bench system in the laboratory, with respect to the application without magnetic field.

The device described herein can be installed in any pipeline used for the transport of fluids, including subsea pipelines from oil wells. These fluids can be oils, lubricants, gases, steams, water, petroleum or liquids in general.

BRIEF DESCRIPTION OF THE FIGURES

In order to complement the present description and obtain a better understanding of the characteristics of the present invention, and in accordance with a preferential embodiment thereof, a set of figures is presented in annex, where in an exemplified way, although not limiting, it represents the preferred embodiment.

DETAILED DESCRIPTION OF THE INVENTION

The present invention refers to a device with diametral magnetic arrays for installations in magnetic SUBs, aiming the remediation and/or mitigation of inorganic and organic scale in oil production columns. The proposed magnetic device meets several specific criteria based on the magnetrohydrodynamic model (MHD), which is the theoretical model that studies the interactions between conducting fluids (and also gases) (ionic and/or saline fluids) and magnetic fields.

Figure 1:
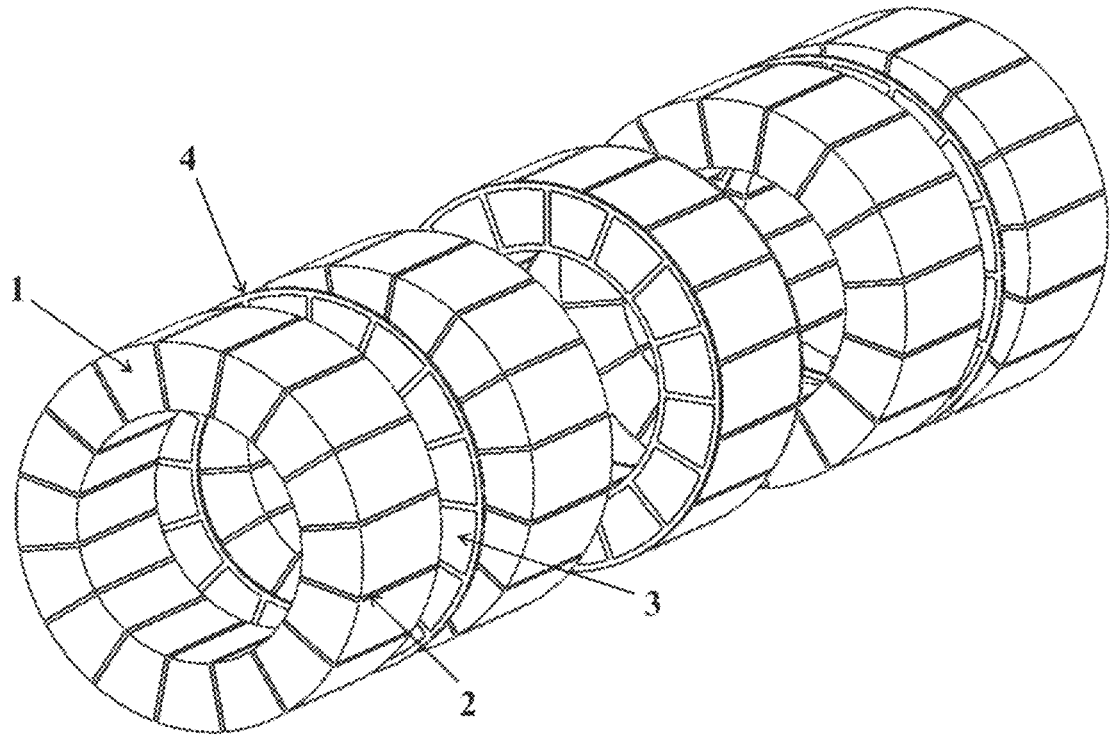
In FIG. 1 an exploded view of the device, highlighting the fact that it comprises at least five magnetic arrays of permanent magnets is represented, in accordance with a preferred embodiment of the present invention.

As shown in FIG. 1, which represents a perspective view of the device of the present invention, it is noted that it comprises permanent magnets (1) together with the magnet separator plates (2), preferably made of superalloys class steel and/or special nickel alloys. The magnets are distributed in the form of a ring, forming a type of cylindrical magnetic arrangement in the Halbach form, different from the conventionally used.

Furthermore, this difference is also due to the magnetization orientation in some of the magnets with different magnetization angle than the conventional one. All permanent magnets of the present invention have different magnetic moments, but always orthogonal to the fluid flow or orthogonal to the axial axis of the cylindrical system formed by the magnet set.

Also, it is important to point out that the device of the present invention preferably uses higher grade neodymium (NdFeB) magnets such as N48SH (or higher grade) which offers high work efficiency at high temperatures, or another grade or magnet material with similar physics and mechanics properties. These magnets offer great magnetic energy at high working temperatures (greater than 100° C.), especially for application in the extreme conditions of pre-salt wells.

Each magnetic array of magnets produces magnetic field lines directed at 90° with respect to its neighboring magnetic array, thus, along the axial axis of the cylindrical system of the magnetic SUB the fluid flow will feel an oscillating magnetic field in direction (counterclockwise), but of uniform intensity (of the order of 0.54 T) guaranteeing a greater volume of constant magnetic field intensity throughout the internal region of the device.

The function of the magnet separator plates (2) in each magnetic arrangement is to serve as a support to avoid crushing the magnets, this due to the pressure differential in the oil well, as well as to avoid demagnetization between the magnets of different orientations. Each magnetic array consists of at least sixteen 16 permanent magnets, forming a cylinder with an outer diameter and an inner diameter of 17.9 cm and 11.6 cm, respectively, and a length (L) of 7 cm.

The device additionally comprises magnetic arrays separator plates (3) in a ring-like format, which can preferably be made of superduplex steel (SD), with at least 2 mm thick. The magnetic array separator plates (3) are located and supported around the support plate (4) and serve as a support to fix the at least sixteen magnetic array separator plates (3), forming a 2 mm thick disc with outer diameter and inner diameter of 17.9 cm and 11.6 cm, respectively.

The support plates (4), as well as the magnet separator plates (2), can preferably be made of superalloys class steel and/or special nickel alloys. The function of the support plates (4) is to separate each magnetic array, as well as close the field lines that are produced between each array, this is important, since it allows to increase the magnetic field intensity along the fluid flow (reaching up to 0.8 T close to the inner wall of the cylinder formed by the magnetic assembly).

As previously mentioned, one of the great advantages of the present invention device together with its specific magnetic set of permanent magnets is the fact that it produces a uniform dipole magnetic field, but oscillating along the fluid flow. The oscillation is produced by changes in the direction of the field lines that rotate 90° in each magnetic arrangement with respect to the next.

Figure 2:
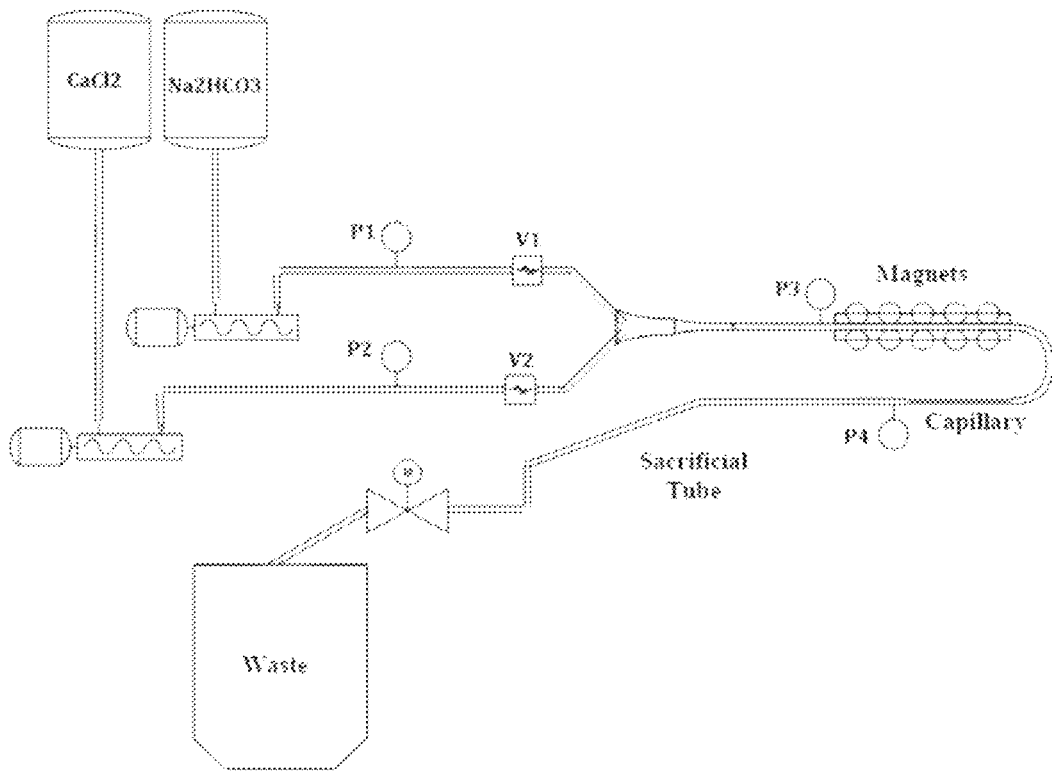
In FIG. 2 the laboratory bench system called MAGWATER, where the tests used in the present invention were carried out is represented, according to a preferred embodiment of the present invention.

In order to carry out the supporting tests and validation of the efficiency and inventiveness of the present invention device, a bench system was designed and assembled for carrying out scale tests from $CaCl_2$) and $NaHCO_3$ salts, as shown in FIG. 2. From this bench system, called MAGWATER, scale inhibition was observed after applying the proposed magnetic field configuration, as we will see below.

Figure 3:
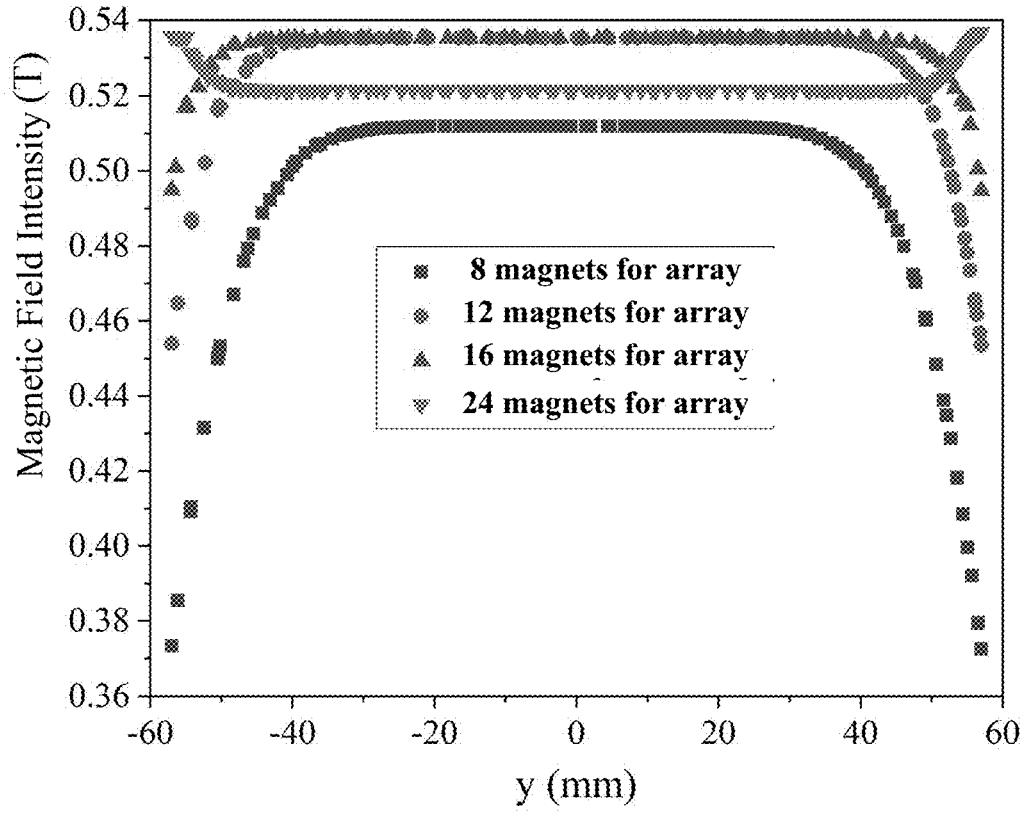
In FIG. 3 a graph of the magnetic field intensity produced inside each magnet arrangement is represented, according to a preferred embodiment of the present invention.

Several computer simulations were carried out to design magnetic arrays of permanent magnets with greater efficiency, that is, with greater intensity and greater uniformity of the magnetic field lines until arriving at the device model described in the present invention, in which it is formed by at least five diametral magnetic arrays, where each magnetic array produces a dipolar and uniform magnetic field configuration. And in which each magnetic arrangement comprises at least sixteen permanent magnets and produces a dipole magnetic field of uniform intensity, as shown in FIG. 3.

Figure 4:
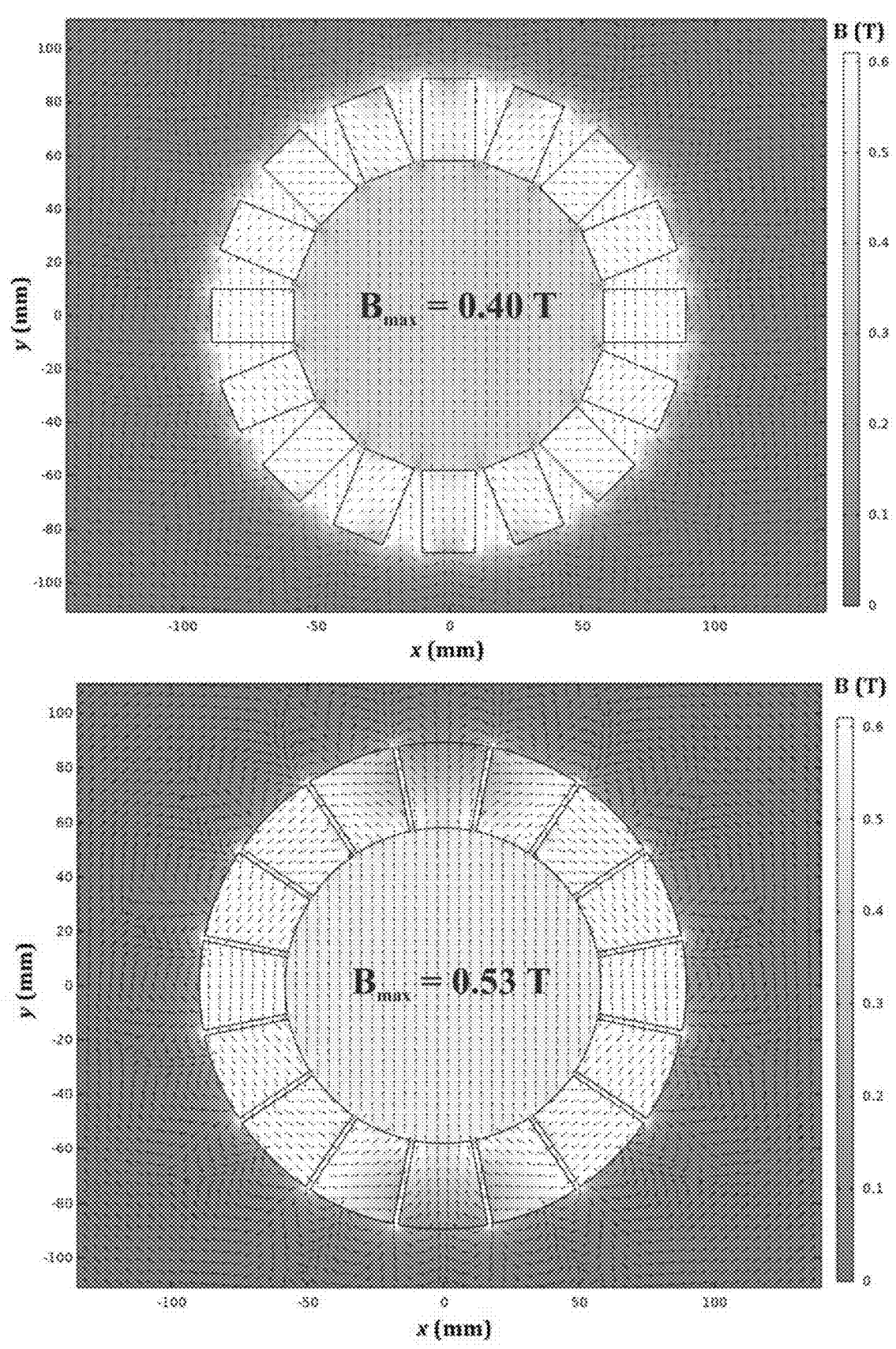
In FIG. 4 schemes of simulations of magnetic arrays that were carried out comparing the type of the magnet's geometry used in each arrangement are represented, according to a preferred embodiment of the present invention.

Simulations were also performed comparing the type of geometry of the magnets used in each arrangement. The result is shown in FIG. 4. By analyzing FIG. 4, it is confirmed that the type of rectangular magnet (typically used in other patent documents) does not offer greater magnetic confinement in its interior. If the magnets are of rectangular geometry, these in the Hallbach distribution, will produce a magnetic field of up to 0.28 T (near the inner tube wall). Also, if the magnets are in contact, the magnetic field intensity will not be uniform.

Therefore, all permanent magnets used in the device of the present invention preferably have trapezoidal geometry with cylindrical bases (shaped like a slice of cake), but not limited to this format only. This trapezoidal geometry results from the delivery of greater magnetic energy offered to the fluid, which is also dependent on the volume of the permanent magnet.

Figure 5:
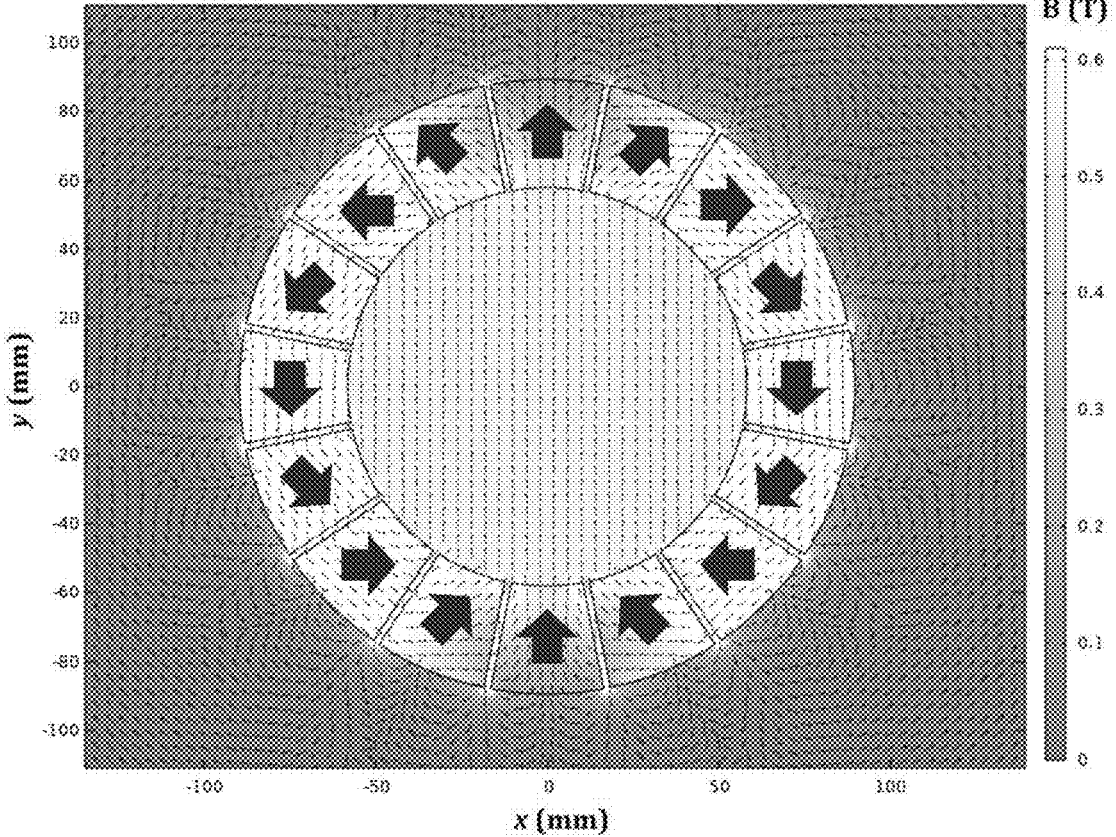
In FIG. 5 a front view of the device demonstrating that it comprises at least 16 magnets with differentiated orientations in order to produce a uniform magnetic field is represented, according to a preferred embodiment of the present invention.

As shown in FIG. 5, the proposed magnetic device is made up of five arrays where each arrangement produces a uniform magnetic field configuration within the entire inner tube region (one-pole magnetic field configuration). The field intensity varies between 0.29-0.47 T, being lowest in the center and highest near the inner tube wall.

Still according to FIG. 5, the first magnetic arrangement of the device (magnetic SUB), starting from the left, produces a magnetic field directed downwards or indicating at 06 hour (5). The second arrangement of the device produces a field pointing at 03 h, the next arrangement has a field pointing at 00 h, the fourth arrangement has the field pointing at 09 h, and so on.

Figure 6:
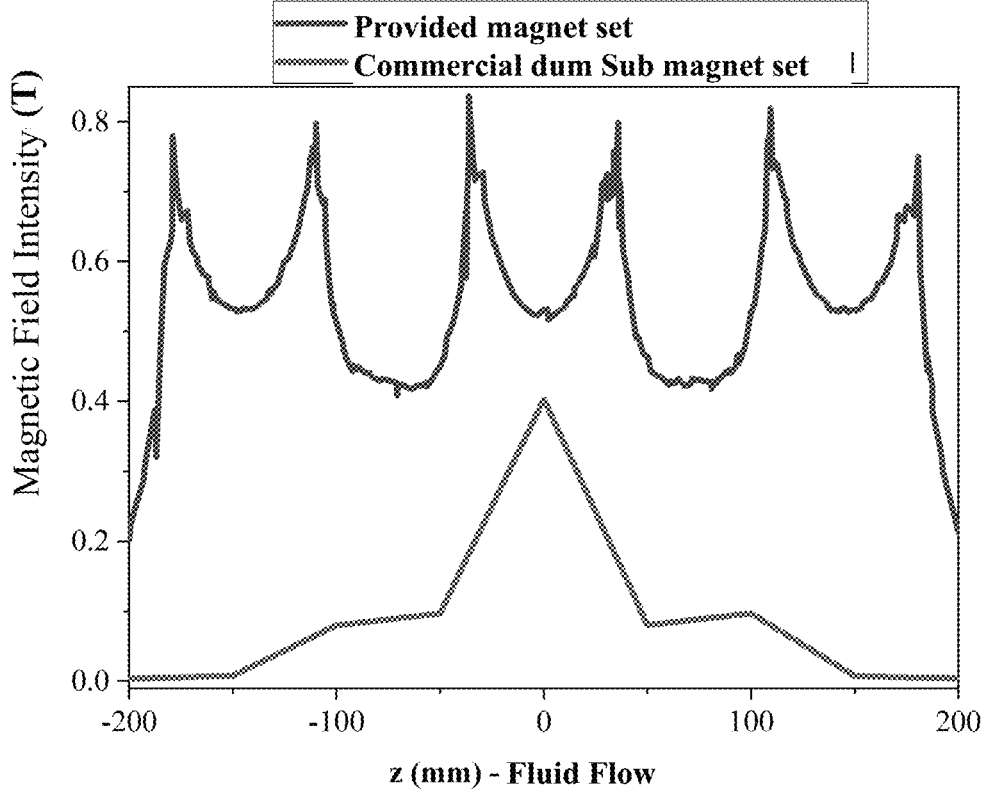
In FIG. 6 a comparative graph of the magnetic field intensity using a conventional magnet set and using the device proposed in this document is represented, according to a preferred embodiment of the present invention.

As evidenced in FIG. 6, in which a comparative graph of magnetic field intensity is presented using the device of the present invention and using a conventionally used magnet set, it is clearly noted that with the device of the present invention, intensities of magnetic field greater than those achieved by conventional technologies are achieved.

Figure 7:
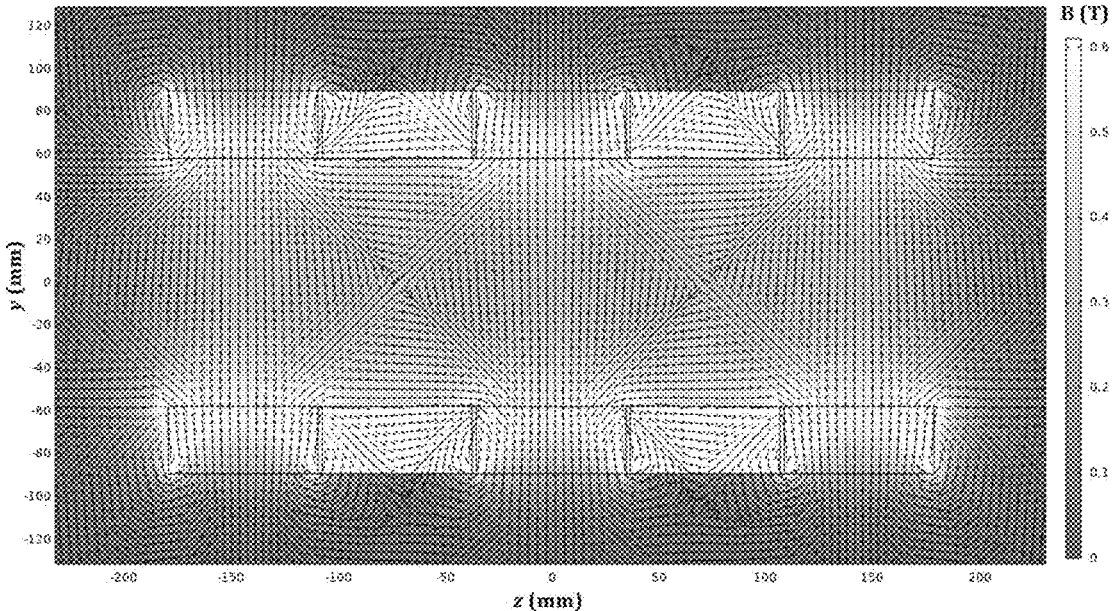
In FIG. 7 a diagram demonstrating that magnetic field intensities above 0.43 T are observed throughout the internal region of the magnet set with the use of the device proposed in this document is represented, in accordance with a preferred embodiment of the present invention.

As shown in FIG. 7, the present invention device produces oscillating magnetic field intensities ranging from 0.43 T to 0.82 T (in regions close to the inner walls of the cylinder formed by the magnetic assembly). Magnetic field intensities above 0.43 T are observed throughout the inner region of the magnet array.

Figure 8:
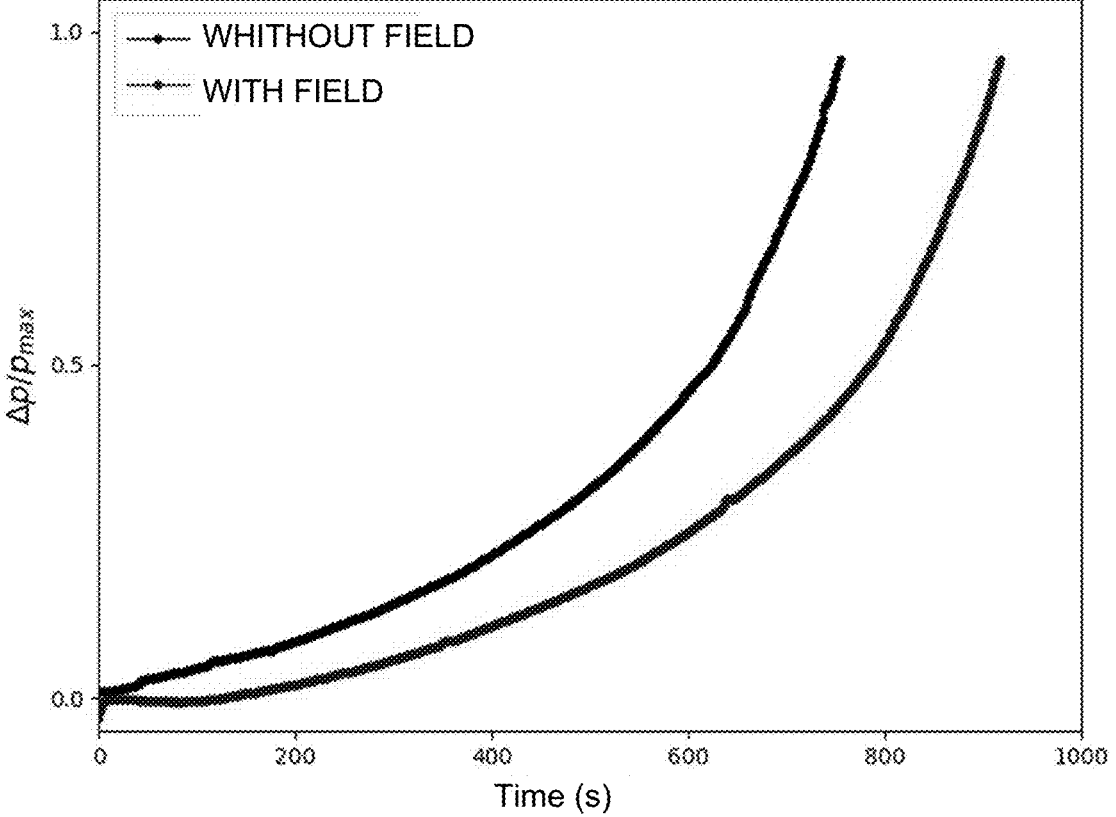
In FIG. 8 a comparative graph showing the scale time without using a magnet set (without magnetic field) and using a magnet set is represented, as described in the proposed device (with magnetic field), according to a preferred embodiment of the present invention.

FIG. 8 shows a comparative graph of the scale time without using a magnet set (without magnetic field) and using the device with the magnet set of the configuration proposed in the present invention (with magnetic field). With this, a longer test time is confirmed before reaching the incrustation when a magnetic field is used than without using a magnetic field. This can also be understood that by using this magnet set, there will be greater inhibition of scale.

Figure 9:
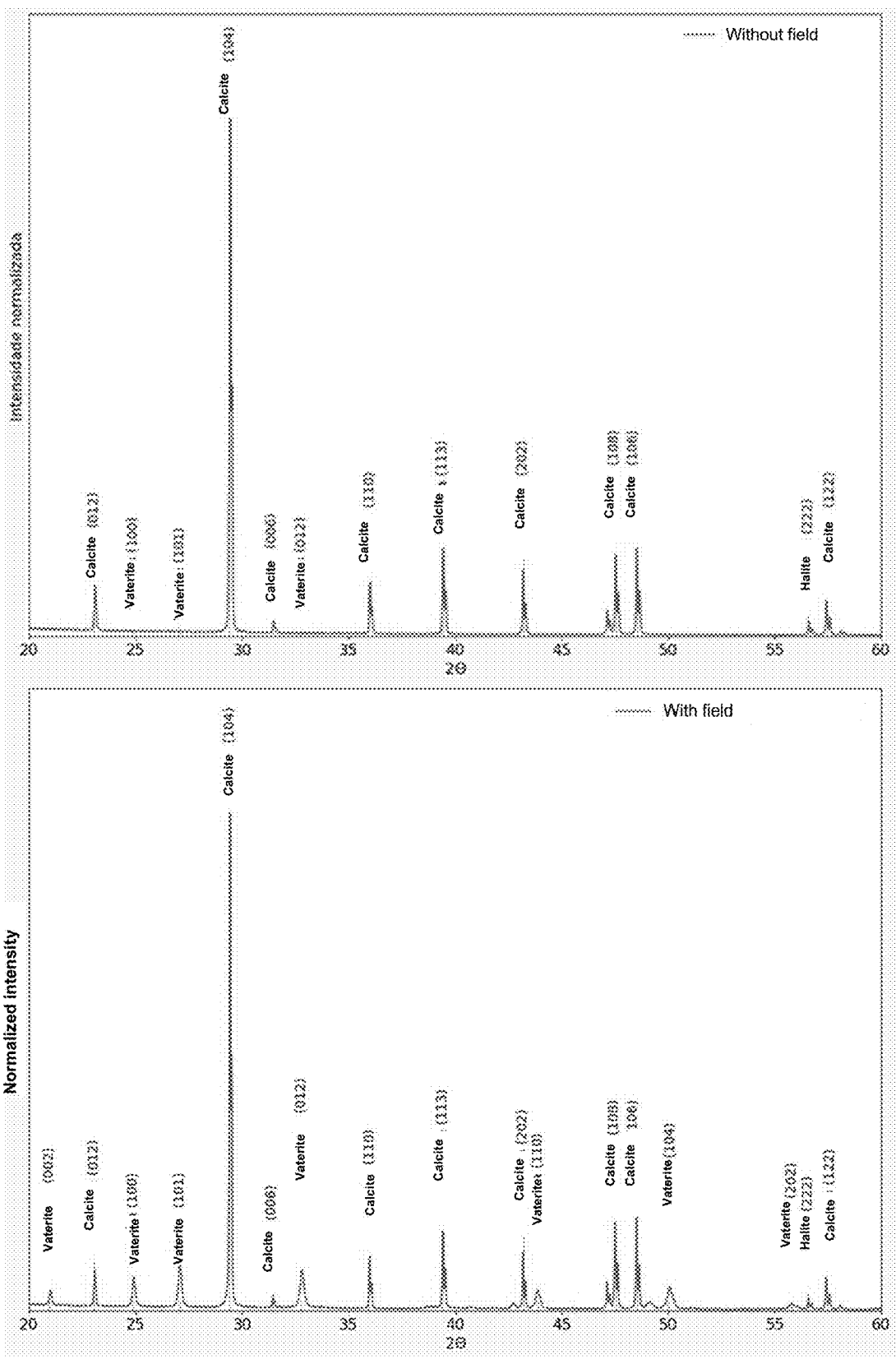
In FIG. 9 a characterization carried out by X-Ray Diffraction (DRX) of the composition of the material encrusted in the walls of the tubes of the scale experimental system is represented, according to a preferred embodiment of the present invention.

FIG. 9 shows the results of an X-Ray Diffraction (XRD) characterization of the composition of the material encrusted in the tube walls of the scale experimental system. It is evident that, without using a magnetic field, the encrusted material is completely formed by calcite, which is a calcium carbonate that is thermodynamically more stable (less soluble) and difficult to descale from the deposited walls. It is also evidenced that when using a magnetic field there is the formation of more soluble phases of calcium carbonates such as vaterite, thermodynamically more unstable and easily removed.

Thus, with this configuration of the magnetic field proposed in the device, an efficiency of scale inhibition obtained by the values of the masses encrusted in the walls of the laboratory experimental bench system of up to 60% was observed experimentally, with respect to the application without magnetic field. Even with this oscillating dipole magnetic field application, a longer productivity time was observed than with respect to the application without magnetic field.

A device (magnetic SUB) using this arrangement of magnetic assembly will not produce obstructions in view the flow step (ensuring fluids with less turbulence than those already patented), thus, the present invention ensures greater performance over the action of the magnetic field applied to the surrounding fluids.

In view of the above, it was noted that the magnetic device proposed in this invention with a specific magnetic set minimizes scales, such as calcium carbonate, on the walls of the tubes where ionic fluids flow. At the same time, it was noted that this application produces the formation of soluble phases of calcium carbonates such as vaterite and other amorphous ones. This information is confirmed by tests produced in the laboratory and which are shown in this document.

It is concluded that the proposed magnetic field configuration in the device of the present invention produces a scale inhibition efficiency factor of 22% (minimum) compared to that without using magnetic field. With this efficiency in delaying the formation of scales, additional savings are projected in the spacing between interventions in the oil well in order to restore its productivity.

Those skilled in the art will value the knowledge presented herein and will be able to reproduce the invention in the presented embodiments and in other variants, covered in the scope of the appended claims.

The invention claimed is:

1. A device with magnetic arrays for the remediation and mitigation of scale in production columns, the device comprising:
   a plurality of cylindrical magnetic arrays, wherein each of the plurality of cylindrical magnetic array comprises:
      a plurality of permanent magnets positioned in a ring shape, wherein each of the plurality of permanent magnets is separated by magnet separator plates which prevent damage or demagnetization of the permanent magnets; and
      a plurality of support plates comprising a plurality of magnetic array separator plates arranged in a ring-type shape, wherein each of the plurality of cylindrical magnetic arrays is separated by one of the plurality of support plates to close the magnetic field lines that are produced between each cylindrical magnetic array.

2. The device of claim 1, wherein the ring shape of the plurality of cylindrical magnetic arras comprises an outer ring diameter of 17.9 cm, an inner ring diameter of 11.6 cm, and a length of 7 cm.

3. The device of claim 1, wherein each of the plurality of permanent magnets is a trapezoidal shape.

4. The device of claim 1, wherein each of the plurality of permanent magnets is orthogonal in orientation to an axial axis of the magnetic arrays.

5. The device of claim 1, wherein the plurality of permanent magnets comprise high-grade neodymium (NdFeB) magnets.

6. The device of claim 1, wherein each of the plurality of the magnet separator plates comprise one or more of superalloy class steel, and special nickel alloy.

7. The device of claim 1, wherein each of the plurality of the magnetic array separator plates comprise superduplex steel.

8. The device of claim 1, wherein each of the plurality of the support plates comprise one or more of superalloy class steel, and special nickel alloy.

9. The device of claim 1, wherein each of the plurality of cylindrical magnetic array produces a uniform dipole magnetic field line directed at 90° in relation to a neighboring magnetic array.

10. The device of claim 1, wherein the plurality of cylindrical magnetic arrays are configured to be positioned radially around a pipeline, and wherein the plurality of cylindrical magnetic arrays are configured to reduce bioscale formation in the pipelines.

11. The device of claim 10, wherein the pipeline carries one or more of an oil, lubricant, gas, steam, water, or petroleum.

12. The device of claim 7, wherein each of the plurality of the magnetic array separator plates comprise a thickness of 2 mm.

13. The device of claim 10, wherein the pipeline is an underwater oil pipeline.

* * * * *